US008862257B2

(12) United States Patent
Zhang (10) Patent No.: US 8,862,257 B2
(45) Date of Patent: Oct. 14, 2014

(54) METHOD AND DEVICE FOR CLIPPING CONTROL

(75) Inventor: Deming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 180 days.

(21) Appl. No.: 13/335,300

(22) Filed: Dec. 22, 2011

(65) Prior Publication Data

US 2012/0095580 A1 Apr. 19, 2012

Related U.S. Application Data

(63) Continuation of application No. PCT/CN2010/074360, filed on Jun. 24, 2010.

(30) Foreign Application Priority Data

Jun. 25, 2009 (CN) .......................... 2009 1 0108528

(51) Int. Cl.
  *G06F 17/00* (2006.01)
  *G10L 21/02* (2013.01)
  *H04L 25/03* (2006.01)

(52) U.S. Cl.
  CPC .......... *G10L 21/02* (2013.01); *H04L 25/03828* (2013.01)
  USPC ....................................................... 700/94

(58) Field of Classification Search
  USPC .............................. 700/94; 375/295, 296, 297
  See application file for complete search history.

(56) References Cited

U.S. PATENT DOCUMENTS

| 7,376,197 B2 * | 5/2008 | Berangi et al. ................. 375/285 |
| 2002/0128830 A1 | 9/2002 | Kanazawa et al. |
| 2002/0181610 A1 * | 12/2002 | Sumasu et al. ................. 375/296 |
| 2004/0014436 A1 * | 1/2004 | Lipka et al. .................... 455/112 |
| 2004/0165524 A1 * | 8/2004 | Chen et al. ..................... 370/208 |
| 2006/0034448 A1 * | 2/2006 | Parry ........................ 379/406.01 |
| 2007/0136050 A1 * | 6/2007 | Tourwe ......................... 704/205 |
| 2007/0164885 A1 * | 7/2007 | Andersen ...................... 341/143 |

(Continued)

FOREIGN PATENT DOCUMENTS

| CN | 1870616 A | 11/2006 |
| CN | 1972264 A | 5/2007 |

(Continued)

OTHER PUBLICATIONS

Abel et al.; "Restoring a Clipped Signal"; CH2977-7/91/0000-1745; 1991 IEEE; (4 pgs.).

(Continued)

*Primary Examiner* — Vivian Chin
*Assistant Examiner* — Leonard M Giannone
(74) *Attorney, Agent, or Firm* — Conley Rose, P.C.; Grant Rodolph; Nicholas K. Beaulieu (57) ABSTRACT

A method and a device for clipping control are provided in the present invention. The method includes: updating a clipping factor according to a maximum absolute value FrameLev in a current frame signal; obtaining a clipping restoration filter according to the clipping factor; filtering the current frame signal according to the clipping restoration filter to obtain a filtered clipping restoration signal. With the method and device for clipping control provided in the present invention, whether a clipping phenomenon occurs may be automatically detected, and clipping restoration is performed, so that subjective quality of an output signal is improved.

15 Claims, 3 Drawing Sheets

(56) References Cited

U.S. PATENT DOCUMENTS

| | | | |
|---|---|---|---|
| 2007/0183684 A1* | 8/2007 | Bhattacharjya | 382/274 |
| 2007/0188218 A1 | 8/2007 | Ueda | |
| 2007/0201567 A1* | 8/2007 | Liu et al. | 375/260 |
| 2008/0089224 A1* | 4/2008 | Kim et al. | 370/210 |
| 2008/0137767 A1* | 6/2008 | Jaenecke | 375/267 |
| 2008/0247487 A1* | 10/2008 | Cai et al. | 375/296 |
| 2009/0034407 A1* | 2/2009 | Lindh | 370/210 |
| 2009/0083031 A1* | 3/2009 | Atlas et al. | 704/219 |
| 2009/0097547 A1* | 4/2009 | Ugur et al. | 375/240.02 |
| 2009/0262841 A1* | 10/2009 | Chalil | 375/242 |
| 2013/0238108 A1* | 9/2013 | Millington | 700/94 |

FOREIGN PATENT DOCUMENTS

| | | | |
|---|---|---|---|
| CN | 101076008 A | 11/2007 | |
| CN | 101136890 A | 3/2008 | |
| CN | 101442348 A | 5/2009 | |
| CN | 101605111 A | 12/2009 | |
| JP | 11074862 | 3/1999 | |
| JP | 2002077097 A | 3/2002 | |
| JP | 2002221988 A | 8/2002 | |
| JP | 2003298549 A | 10/2003 | |
| JP | 2005269550 A | 9/2005 | |
| KR | 20070003545 A | 1/2007 | |
| WO | WO 2009/010010 A1 | 1/2009 | |
| WO | WO 2010/072127 A1 | 7/2010 | |
| WO | WO 2010/149053 A1 | 12/2010 | |

OTHER PUBLICATIONS

Maher; "A Method for Extrapolation of Missing Digital Audio Data"; Oct. 7-10, 1993; (20 pgs.).

Dahimene et al.; "A Simple Algorithm for the Restoration of Clipped Speech Signal"; Informatica 32 (2008) pp. 183-188; (6 pgs.).

International Search Report of the International Searching Authority; dated (mailed) Oct. 23, 2008; related to Application No. PCT/CN2008/071670; (6 pgs.).

Ali-Hemmati et al.; "Iterative cancellation of clipping noise in multilevel quadrature amplitude modulation multi-carrier CDMA system"; IET Commun., 2008, 2, (2), pp. 300-305; (6 pgs.).

European Patent Office Communication related to the Application No. 10791559.7-2415; pursuant to Rule 62 EPC, the supplementary European search report (Art. 153(7) EPC) and the European search opinion; (9 pgs.) dated Feb. 22, 2012.

Foreign Communication From a Counterpart Application, Japanese Application No. 2012516499, Japanese Office Action dated May 28, 2013, 2 pages.

Foreign Communication From a Counterpart Application, Japanese Application No. 2012516499, English Translation of Japanese Office Action dated May 28, 2013, 1 page.

International Search Report for International Application No. PCT/CN2010/074360, mailed Sep. 30, 2010 Huawei Technologies Co., Ltd.

Written Opinion of the International Searching Authority (translation) dated (mailed) Sep. 30, 2010, issued in related Application No. PCT/CN2010/074360, filed Jun. 24, 2010, Huawei Technologies Co., Ltd.

International Search Report for International Application No. PCT/CN2009/075709, mailed Mar. 25, 2010 Huawei Technologies Co., Ltd.

Foreign Communication From A Counterpart Application, Korean Application No. 10-2011-7029856, English Translation of Korean Office Action dated Sep. 30, 2013, 2 pages.

Foreign Communication From A Counterpart Application, Japanese Application No. 2012-516499, Determination of Allowance dated Mar. 18, 2014, 4 pages.

\* cited by examiner

METHOD AND DEVICE FOR CLIPPING CONTROL

CROSS-REFERENCE TO RELATED APPLICATIONS

This application is a continuation of International Application No. PCT/CN2010/074360, filed on Jun. 24, 2010, which claims priority to Chinese Patent Application No. 200910108528.X, filed on Jun. 25, 2009, both of which are hereby incorporated by reference in their entireties.

FIELD OF THE INVENTION

The present invention relates to the field of the communication technologies, and in particular, to a method and a device for clipping control.

BACKGROUND OF THE INVENTION

In a practical digital signal processing system, a range of outputting a signal is always limited. For example, the largest level range of a 16-bit digital signal is [−32768, 32767]. When an output signal exceeds the range, the amplitude of the signal is limited, that is to say, clipping processing is performed. This highly effective and simple processing method is used in many digital signal processing systems. A clipping phenomenon occurs in voice communication and general audio processing. When a signal is clipped, a large amount of high-frequency harmonics are generated, thus damaging the continuity of a time domain of the signal. The signal discontinuity severely affects auditory experiences, and subjective quality is obviously deteriorated.

In order to improve the subjective quality deterioration caused by clipping, currently, common processing methods generally include cubic spline predication and AR prediction. However, at present, by using these methods, a clipped signal cannot be automatically detected and self-adaptive gain adjustment cannot be performed on the clipped signal, and therefore, essentially improving the subjective quality of the clipped signal is rather difficult. In addition, for clipping restoration methods such as the cubic spline predication and the AR predication, since a signal range may be larger than a range of a signal at an input end or output end during intermediate processing of a system, a range of a restored signal generated by a single clipped signal restoration method may exceed a range of an input or output signal, so that a clipped signal may still be generated when the system is outputting.

SUMMARY OF THE INVENTION

The embodiments of the present invention provide a method and a device for clipping control, so as to solve problems that an existing clipping restoration method is incapable of detecting a clipped signal automatically and that subjective quality of an output signal is poor.

A method for clipping control includes:

updating a clipping factor according to a maximum absolute value FrameLev in a current frame signal;

obtaining a clipping restoration filter according to the clipping factor; and filtering the current frame signal according to the clipping restoration filter to obtain a filtered clipping restoration signal.

A device for clipping control includes:

a clipping factor updating unit, configured to update a clipping factor according to a maximum absolute value FrameLev in a current frame signal;

a clipping restoration filter obtaining unit, configured to obtain a clipping restoration filter according to the clipping factor; and a filter unit, configured to filter the current frame signal according to the clipping restoration filter to obtain a filtered clipping restoration signal.

In the embodiments of the present invention, a clipping factor is updated through a maximum absolute value FrameLev in a current frame signal, a clipping restoration filter is obtained and the current frame signal is filtered according to the clipping restoration filter to obtain a filtered clipping restoration signal, so that whether a clipping phenomenon occurs may be automatically detected, and clipping restoration is performed, thus improving subjective quality of an output signal.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art may also derive other drawings from the accompanying drawings without creative efforts.

DETAILED DESCRIPTION OF THE EMBODIMENTS

The technical solutions in the embodiments of the present invention are clearly and completely described in the following with reference to the accompanying drawings in the embodiments of the present invention. Obviously, the embodiments to be described are only a part rather than all of the embodiments of the present invention. Based on the embodiments of the present invention, all other embodiments obtained by persons skilled in the art without creative efforts shall fall within the protection scope of the present invention.

Figure 1:
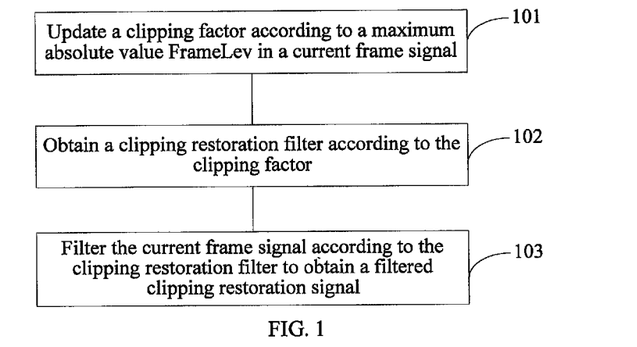
FIG. 1 shows a method for clipping control according to an embodiment of the present invention.

As shown in FIG. 1, a method for clipping control provided in an embodiment of the present invention includes:

Step 101: Update a clipping factor according to a maximum absolute value FrameLev in a current frame signal.

Step 102: Obtain a clipping restoration filter according to the clipping factor.

Step 103: Filter the current frame signal according to the clipping restoration filter to obtain a filtered clipping restoration signal.

In this embodiment of the present invention, the clipping factor is updated according to the maximum absolute value FrameLev in the current frame signal, the clipping restoration filter is obtained, and the current frame signal is filtered according to the clipping restoration filter to obtain the filtered clipping restoration signal, so that whether a clipping phenomenon occurs may be automatically detected, and clipping restoration is performed, thus improving subjective quality of an output signal. The subjective quality is used for describing quality of a voice or audio signal.

Figure 2:
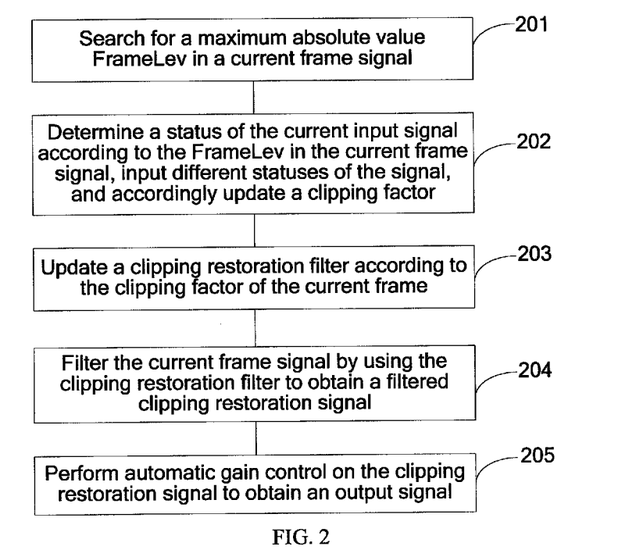
FIG. 2 shows another method for clipping control according to an embodiment of the present invention.

FIG. 2 shows another method for clipping control according to an embodiment of the present invention. It is assumed that a sampling rate of an input voice/audio signal is 8000, the frame length of signal processing is 20 ms, that is, a frame signal has 160 sampling points, and a signal processing system is 16-bit, that is, a range of an input signal and an output signal of the system is [−32768, 32767]. It is assumed that a $K^{th}$ frame input signal processed by the system is represented as $S_k\{s_k(0), s_k(1), \ldots, s_k(159)\}$. Therefore, the method includes:

Step 201: Search for a maximum absolute value FrameLev in a current frame signal. FrameLev=abs($s_k(i)$), i=0, 1, ..., 159, where $s_k(i)$ is a current frame signal of an input signal.

Step 202: Determine a status of the current input signal according to the FrameLev in the current frame signal, input different statuses of the signal, and accordingly update a clipping factor C. A specific process is as follows.

A) If FrameLev>THR1, it is considered that the input signal is in a clipping status. At this time, the clipping factor C is rapidly increased, that is, $C_k=C_{k−1}+\beta_1$.

B) If THR1>=FrameLev>THR2, it is considered that the input signal is not in the clipping status, but is quite close to the clipping status, that is, in an approximate clipping status. At this time, the clipping factor C is slowly decreased, that is, $C_k=C_{k−1}−\beta_2$.

C) If THR2>=FrameLev>THR3, it is considered that the input signal is not in the clipping status, and the amplitude of the signal is not large. At this time, the clipping factor C is rapidly decreased, that is, $C_k=C_{k−1}\beta_2$.

D) If THR3>=FrameLev, it is considered that the input signal is not in a clipping status, and the amplitude of the signal is quite small. The clipping factor C is kept unchanged, that is, $C_k=C_{k−1}$.

In the process of determination and update of the clipping factor, the clipping factor $C_k$ of a current frame is adjusted within an interval [0, 1], that is, $$C_k = \begin{cases} 0 & C_k < 0 \\ 1 & C_k > 1 \\ C_k & \text{else} \end{cases}$$

where, THR1, THR2 and THR3 are respectively a first threshold, a second threshold and a third threshold, and are used for representing amplitude intervals of the signal, that is, $−2^x<=$THR3<THR2<THR1$<=2^x$, where x is the number of bits of the signal processing system. In this embodiment of the present invention, a 16-bit signal processing system is taken as an example, and −32768<=THR3<THR2<THR1<=32767. $\beta_1$, $\beta_2$, and $\beta_3$ represent update speeds of the clipping factor C. $0\leq\beta_2\leq\beta_3<\beta_1\leq1$, and $C_k$ is the clipping factor of the current frame signal, and $C_{k−1}$ is a clipping factor of a previous frame signal. In this embodiment, preferentially, THR1=32766, THR2=32767*0.9, THR3=32767*0.1, and $\beta_1$=0.1, $\beta_2$=0.005, $\beta_3$=0.01, $C_0$=0.

Step 203: Update a clipping restoration filter according to the clipping factor of the current frame. The clipping restoration filter is an all-pass filter, and a state function of an N-order all-pass filter is, $$H(z) = \frac{(1-a_1z) \times (1-a_2z) \ldots (1-a_Nz)}{(z-a_1) \times (z-a_2) \ldots (z-a_N)},$$

$a_1=\alpha_1C_k$, $a_2=\alpha_2C_k$, ..., $a_N=\alpha_NC_k$, $|a_i|<1$.

In this embodiment, the clipping restoration filter adopts a 1-order all-pass filter, and the state function is, $$H_k(z) = \frac{1-\eta_k z}{z-\eta_k},$$

where a filter parameter $\eta_k$ is determined by the clipping factor, that is, $\eta_k=\lambda C_k$, $|\lambda|<1$. In this embodiment, preferentially, $\lambda$=0.5. Definitely, in another embodiment, $\lambda=−0.5$ is also preferred.

Step 204: Filter the current frame signal $S_k\{s_k(0), s_k(1), \ldots, s_k(159)\}$ by using the clipping restoration filter to obtain a filtered clipping restoration signal $S'_k\{s_k'(0), s_k'(1), \ldots, s_k'(159)\}$. A specific filtering process is as follows.

It is assumed that the current frame signal is represented as $S_k(z)$ in a z domain, and the clipping restoration signal is represented as $S'_k(z)$ in the z domain.

Therefore, the filtering process in the z domain may be represented as:

$$S'_k(z) = H_k(z) \times S_k(z)$$

$$S'_k(z) = \frac{z^{-1} - \eta_k}{1 - \eta_k z^{-1}} \times S_k(z); \text{ and}$$

$$(1 - \eta_k z^{-1}) \times S'_k(z) = (z^{-1} - \eta_k) \times S_k(z)$$

accordingly, in a time domain, may be represented as:

$$s'_k(i)-\eta_k s'_k(i-1) = -\eta_k s_k(i) + s_k(i-1)$$

$$s'_k(i) = -\eta_k s_k(i) + s_k(i-1) + \eta_k s'_k(i-1)$$

Make $y_k=s_k(i)+\eta_k \times s_k'(1)$ as an intermediate variable in the filtering process.

Therefore, the filtering process in the time domain may be represented as:

$$s_k'(i)-\eta_k \times s_k(i)+y_{k-1}.$$

$$y_k=s_k(i)+\eta_k \times s_k'(i)$$

Step 205: Since during intermediate processing of the system, a range of a signal may exceed a range of [−32768, 32767], when the signal has a quite large amplitude, clipping is still performed during final output of the system, so that an obtained final output signal still has a clipped signal, and subjective quality is not high. Therefore, after clipping restoration is performed on the signal, in this embodiment of the present invention, automatic gain control may also be performed on the clipping restoration signal, so that the signal can be normally output at an output end of the system. A specific process of the automatic gain control is as follows.

1) Calculate an automatic gain control factor.

The automatic gain control factor is determined by the clipping factor of the current frame, that is, $$g_k = \alpha g_{k-1} + \frac{(1-\alpha)}{1+2|C_k|}.$$

$\alpha$ is a gain update factor and is also determined by the clipping factor. Specifically, $C_k$ represents a trend of the amplitude of the signal. If $C_k$ is in a rapidly increasing phase and $C_k$<THR4, make $\alpha$=0.5, which represents rapid transition to an expected gain. If $C_k$ is in a rapidly increasing phase and THR4$\leq C_k$, make $\alpha=0.5+0.49*(C_k-0.75)*4$, which represents slow transition to the expected gain from rapid transition. In addition to the preceding two cases, α=0.99 represents slow transition to the expected gain. THR4 represents a clipping status interval of the clipping factor $C_k$, where in this embodiment, THR4=0.75.

2) Perform gain adjustment on the clipping restoration signal according to the automatic gain control factor. A specific adjustment process is as follows.

An automatic gain control factor $g_{k-1}$ of a previous frame and an automatic gain control factor $g_k$ of the current frame are interpolated to obtain a gain control curve G{g(0), g(1), ... g(159)} of the current frame signal. An interpolation process may be linear interpolation, that is, $$g(i) = g_{k-1} + i \times \frac{g_k - g_{k-1}}{N},$$

where N is the number of sampling points in a frame signal (in this embodiment, N=160). And interpolation may also be performed through a Cosine window or other methods.

Perform the gain adjustment on the clipping restoration signal to obtain a final output signal $S''_k\{s''(0), s''(1), \ldots, s''(159)\}$ after the gain adjustment. An adjustment process is s''(i)=s'(i)×g(i).

Step 205 is optional, which is further optimization processing performed based on the clipping restoration, and may further ensure that the clipping phenomenon is eliminated from the final output signal, so as to obtain a restored signal with better subjective quality.

With a clipping restoration method provided in this embodiment of the present invention, a clipped signal may be self-adaptively detected, and restoration is self-adaptively performed on the clipped signal. Furthermore, in this embodiment of the present invention, automatic gain control may also be performed on the signal to ensure that a clipping phenomenon is eliminated from a final output signal, so as to obtain a restored signal with better subjective quality.

Figure 3:
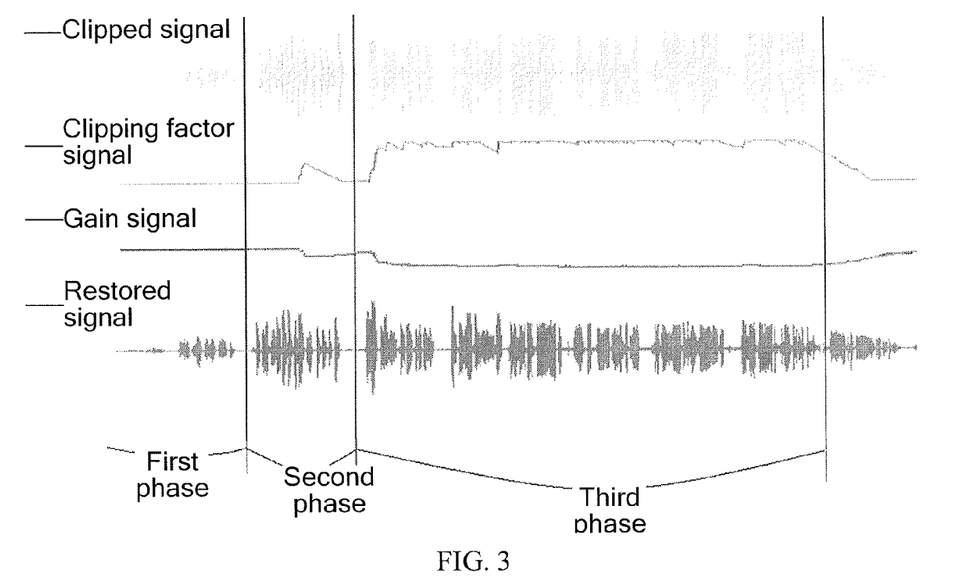
FIG. 3 is a signal schematic diagram of clipping control according to an embodiment of the present invention.

FIG. 3 is a schematic diagram of a signal during practical signal processing. In FIG. 3, a first clipped signal is an input signal of a system, where an obvious clipping phenomenon may be observed. A second clipping factor signal is a clipping factor $C_k$ in system processing. A third gain signal is an automatic gain control factor $g_k$ in the system processing. A fourth restored signal is a final output signal after being processed by the system. It can be seen from FIG. 3 that, in phase 1 (a first phase), the input signal is within a normal amplitude range without a clipped signal, and during this phase, the clipping factor $C_k$ remains to be 0, and the gain factor $g_k$ remains to be 1, that is, in addition to a sampling point delay of the signal, no other changes occur. In phase 2 (a second phase), when the amplitude of the signal becomes larger and the clipped signal occurs, the clipping factor $C_k$ is increased rapidly to realize restoration of the clipped signal. At the same time, the gain factor $g_k$ is decreased rapidly to attenuate energy of the signal, so as to ensure that the clipped signal does not occur in the final output signal. When the amplitude of the input signal becomes smaller and the input signal enters a normal status from a clipping status, the clipping factor $C_k$ is decreased rapidly and the gain factor $g_k$ is decreased slowly to perform fine adjustment on the signal. In phase 3 (a third phase), it can be seen that, when continuous clipped signals occur, the clipping factor $C_k$ is updated at different speeds according to different amplitudes of the input signal, and the gain factor $g_k$ is also adjusted accordingly, so as to ensure that the final output signal of the system has quite good subjective quality.

Figure 4:
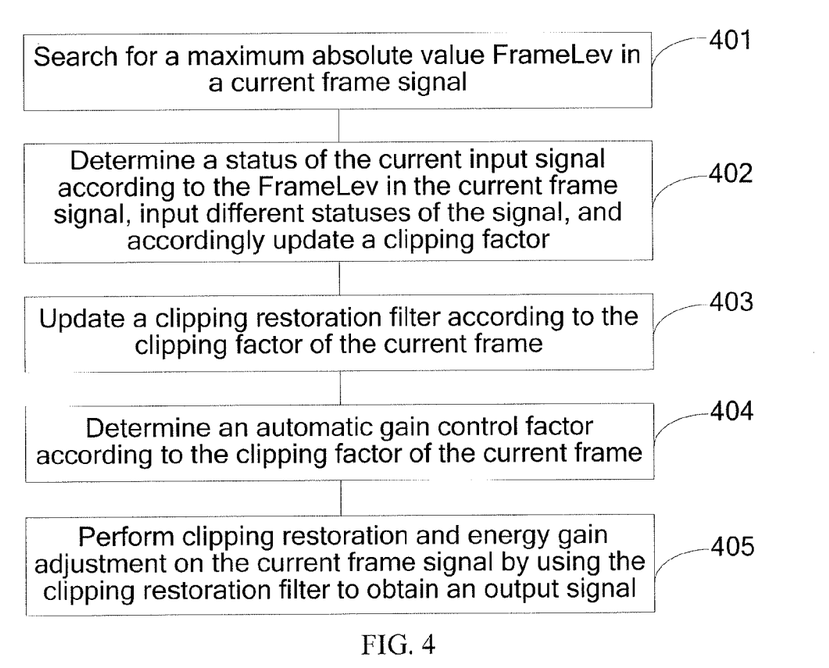
FIG. 4 shows another method for clipping control according to an embodiment of the present invention.

FIG. 4 shows another method for clipping control according to an embodiment of the present invention. A specific application scenario is the same as that in the preceding embodiment.

The method includes:

Steps 401 to 403 are the same as steps 201 to 203.

Step 404: Determine an automatic gain control factor by a clipping factor of a current frame, that is, $$g_k = \alpha g_{k-1} + \frac{(1-\alpha)}{1+2|C_k|},$$

where α is a gain update factor, and is also determined by the clipping factor. Specifically, $C_k$ represents a trend of amplitude of a signal. If $C_k$ is in a rapidly increasing phase and $C_k$<THR4, make α=0.5, which represents rapid transition to an expected gain. If $C_k$ is in a rapidly increasing phase and THR4≤$C_k$, make α=0.5+0.49*($C_k$−0.75)*4, which represents slow transition to the expected gain from rapid transition. In addition to the preceding two cases, α=0.99 represents slow transition to the expected gain. THR4 represents a clipping status interval of the clipping factor $C_k$, and in this embodiment, THR4=0.75.

Step 405: Perform clipping restoration on a current frame signal $S_k\{s_k(0), s_k(1), \ldots, s_k(159)\}$ of an input signal by using a clipping restoration filter, and at the same time, perform energy gain adjustment to obtain an adjusted final output signal $S''_k\{s''(0), s''(1), \ldots, s''(159)\}$. A detailed process is as follows.

$$G(0) = g_{k-1}, G(i) = G(i-1) + \frac{g_k - g_{k-1}}{160}$$

$$s'_k(i) = -\eta_k \times s_k(i) + y_{k-1}$$

$$s''_k(i) = G(i) \times s'_k(i)$$

$$y_k = s_k(i) + \eta_k \times s'_k(i).$$

In the previous embodiment, a filtered clipping restoration signal $S'_k\{s_k'(0), s_k'(1), \ldots, s_k'(159)\}$ is obtained from the input signal $S_k\{s_k(0), s_k(1), \ldots, s_k(159)\}$ through the clipping restoration filter, and automatic gain control is further performed on the clipping restoration signal to obtain $S''_k\{s''(0), s''(1), \ldots, s''(159)\}$. Specific implementation may be realized through two single cycles, that is, after obtaining 160 values of the clipping restoration signal, the automatic gain control is further performed to obtain 160 values of $S''_k\{s''(0), s''(1), \ldots, s''(159)\}$. A difference between the previous embodiment and this embodiment lies in that, energy adjustment and the clipping restoration are performed in the same step. The specific implementation may be realized through a double-cycle, that is, after $s_k'(i)$ is obtained, the automatic gain control is directly performed to obtain s''(i).

With a clipping restoration method provided in this embodiment of the present invention, a clipped signal may be self-adaptively detected, and restoration and automatic gain control may be self-adaptively performed on the clipped signal to ensure that a clipping phenomenon is eliminated from a final output signal, so as to obtain a restored signal with better subjective quality.

Figure 5:
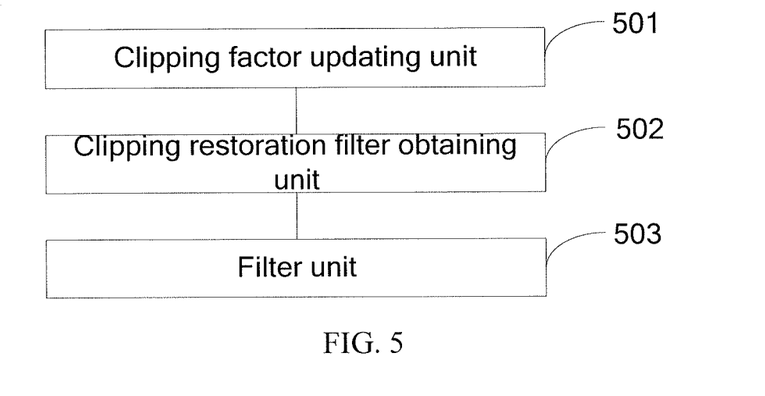
FIG. 5 shows a device for clipping control according to an embodiment of the present invention.

Corresponding to the clipping control method provided in this embodiment of the present invention, an embodiment of the present invention further provides a clipping control device. The steps in the preceding method embodiment may be correspondingly applied to a device embodiment. FIG. 5 shows a device for clipping control according to an embodiment of the present invention. The device includes:

a clipping factor updating unit 501, configured to update a clipping factor according to a maximum absolute value FrameLev in a current frame signal;

a clipping restoration filter obtaining unit 502, configured to obtain a clipping restoration filter according to the clipping factor; and a filter unit 503, configured to filter the current frame signal according to the clipping restoration filter to obtain a filtered clipping restoration signal.

Figure 6:
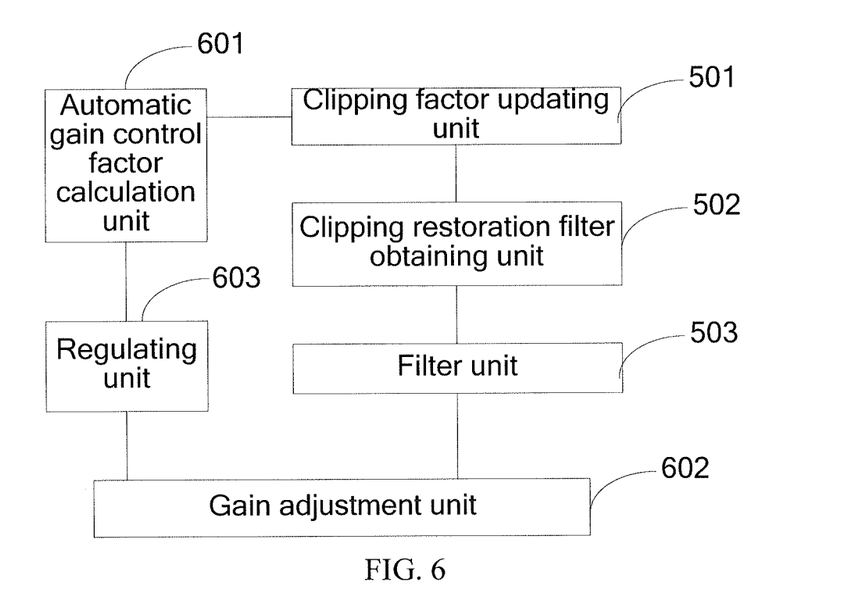
FIG. 6 shows another device for clipping control according to an embodiment of the present invention.

FIG. 6 shows another device for clipping control according to an embodiment of the present invention, and specifically, shows further details of FIG. 5. The device further includes:

an automatic gain control factor calculation unit 601, configured to calculate an automatic gain control factor according to the clipping factor;

a gain adjustment unit 602, configured to perform gain adjustment on a clipping restoration signal according to the automatic gain control factor to obtain an output signal; and a regulating unit 603, configured to regulate the clipping factor of the current frame signal output by the clipping factor updating unit 501 within an interval [0, 1].

Furthermore, if FrameLev>THR1, the clipping factor updating unit 501 is specifically configured to rapidly increase the clipping factor C, that is, $C_k=C_{k-1}+\beta_1$; or, THR1>=FrameLev>THR2, the clipping factor updating unit 501 is specifically configured to slowly decrease the clipping factor C, that is, $C_k=C_{k-1}-\beta_2$; or, THR2>=FrameLev>THR3, the clipping factor updating unit 501 is specifically configured to rapidly decrease the clipping factor C, that is, $C_k=C_{k-1}-\beta_3$; or, THR3>=FrameLev, the clipping factor updating unit 501 is specifically configured to keep the clipping factor C unchanged, that is, $C_k=C_{k-1}$.

THR1, THR2 and THR3 are used for representing amplitude intervals of the signal, where $-2^x <=$ THR3<THR2<THR1<=$2^x$, where x is the number of bits of a signal processing system. $\beta_1$, $\beta_2$, $\beta_3$ are used for representing update speeds of the clipping factor C, $0 \le \beta_2 \le \beta_3 \le \beta_1 \le 1$. $C_k$ is the clipping factor of the current frame signal, and $C_{k-1}$ is a clipping factor of a previous frame signal.

When the clipping restoration filter is a 1-order all-pass filter, the clipping restoration filter obtaining unit 502 is specifically configured to obtain a state function of the 1-order all-pass filter:

$$H_k(z) = \frac{1 - \eta_k z}{z - \eta_k},$$

where, $\eta_k$ is a filter parameter, $\eta_k = |\lambda|_k$, and $C_k$ is the clipping factor of the current frame signal.

The filter unit 503 is specifically configured to filter the current frame signal according to the following expression to obtain a filtered clipping restoration signal:

$$s_k'(i) = \eta_k \times s_k(i) + y_{k-1}.$$

$$y_k = s_k(i) + \eta_k \times s_k'(i)$$

The automatic gain control factor calculation unit 601 is configured to calculate the automatic gain control factor according to the following expression:

$$g_k = \alpha g_{k-1} + \frac{(1-\alpha)}{1+2|C_k|},$$

where, $g_k$ is the automatic gain control factor of the current frame signal, $g_{k-1}$ is a automatic gain control factor of the previous frame signal, $C_k$ is the clipping factor of the current frame signal, and $\alpha$ is a gain update factor.

The gain adjustment unit 602 is specifically configured to, according to the automatic gain control factor $g_{k-1}$ of the previous frame signal and the automatic gain control factor $g_k$ of the current frame signal, obtain a gain control curve G{g(i)} through interpolation, and perform gain adjustment on the clipping restoration signal to obtain an output signal: s"(i)=s'(i)×g(i).

The gain adjustment unit 602 is specifically configured to, according to the automatic gain control factor $g_{k-1}$ of the previous frame signal and the automatic gain control factor $g_k$ of the current frame signal, obtain the gain control curve G{g(i)} through linear interpolation:

$$g(i) = g_{k-1} + i \times \frac{g_k - g_{k-1}}{N},$$

where N is the number of sampling points in a frame signal.

With the clipping control device provided in this embodiment of the present invention, a clipped signal may be self-adaptively detected through a maximum absolute value in a current frame signal, so that restoration is self-adaptively performed on the clipped signal. Furthermore, in this embodiment of the present invention, automatic gain control may also be performed on the signal to ensure that a clipping phenomenon is eliminated from a final output signal, so as to obtain a restored signal with better subjective quality.

Through the preceding description of the implementation manners, a person skilled in the art may clearly understand that the present invention may be accomplished through software plus a necessary hardware platform, and definitely, may also be accomplished all through hardware, however, in most cases, the former is an exemplary implementation manner. Based on this understanding, all or a part of the technical solutions of the present invention that make contribution to the background technology may be embodied in the form of a software product. The computer software product may be stored in a storage medium such as an ROM/RAM, a magnetic disk or an optical disk, and includes several instructions used to instruct computer equipment (may be a personal computer, a server, or network equipment) to perform the method described in each embodiment or in some parts of the embodiment of the present invention.

Although the present invention is described through the embodiments, a person skilled in the art may know that various variations and changes are made to the present invention without departing from the spirit of the present invention. The claims in the application document of the present invention shall include these variations and changes.

What is claimed is:

1. A method implemented by a digital signal processing system for clipping control, comprising:
   updating a clipping factor according to a maximum absolute value FrameLev in a current frame signal;
   obtaining a clipping restoration filter according to the clipping factor;
   filtering the current frame signal according to the clipping restoration filter to obtain a filtered clipping restoration signal;
   calculating an automatic gain control factor according to the clipping factor;
   performing gain adjustment on the clipping restoration signal according to the automatic gain control factor to obtain an output signal; and providing, by the digital signal processing system, the output signal for the clipping control to a computing device to obtain a restored audio signal with better subjective quality, said computing device outputting the restored audio signal, wherein updating the clipping factor according to the maximum absolute value FrameLev in the current frame signal comprises:

increasing a clipping factor C according to $C_k=C_{k-1}+\beta_1$ when the maximum absolute value FrameLev is greater than THR1;

decreasing the clipping factor C according to $C_k=C_{k-1}-\beta_2$, when the maximum absolute value FrameLev is less than or equal to THR1 and is greater than THR2;

decreasing the clipping factor C according to $C_k=C_{k-1}-\beta_3$ when the maximum absolute value FrameLev is less than or equal to THR2 and is greater than THR3; and keeping the clipping factor C unchanged according to $C_k=C_{k-1}$ when the maximum absolute value FrameLev is less than or equal to THR3, wherein THR1, THR2, and THR3 represent amplitude intervals of a signal, wherein $-2^x<=THR3<THR2<THR1<=2^x$, wherein x is a number of bits of a signal processing system, wherein $\beta_1$, $\beta_2$, and $\beta_3$ represent update speeds of the clipping factor C, wherein $0<=/\beta_2<\beta_3<\beta<=1$, wherein $C_k$ is the clipping factor of the current frame signal, and wherein $C_{k-1}$ is a clipping factor of a previous frame signal.

2. The method for clipping control according to claim 1, wherein after updating the clipping factor according to the maximum absolute value FrameLev in the current frame signal, the method further comprises regulating the clipping factor of the current frame signal within an interval [0, 1].

3. A method implemented by a digital signal processing system for clipping control, comprising:

updating a clipping factor according to a maximum absolute value FrameLev in a current frame signal;

obtaining a clipping restoration filter according to the clipping factor;

filtering the current frame signal according to the clipping restoration filter to obtain a filtered clipping restoration signal, calculating, an automatic gain control factor according to the clipping factor;

performing gain adjustment on the clipping restoration signal according to the automatic gain control factor to obtain an output signal; and providing, by the digital signal processing system, the output signal for the clipping control to a computing device to obtain a restored audio signal with better subjective quality, said computing device outputting the restored audio signal, wherein when the clipping restoration filter is a 1-order all-pass filter, a state function of the clipping restoration filter comprises:

$$H_k(z) = \frac{1-\eta_k z}{z-\eta_k},$$

wherein $\eta_k$ is a filter parameter, wherein $\eta_l = \lambda C_k$, $|\lambda|<1$, and wherein $C_k$ is the clipping factor of the current frame signal.

4. The method for clipping control according to claim 3, wherein filtering the current frame signal according to the clipping restoration filter to obtain the filtered clipping restoration signal comprises:

$$s_k'(i)=-\eta_k \times s_k(i)+y_{k-1},$$

$$y_k=s_k(i)+\eta_k \times s_k'(i)$$

wherein $s_k(i)$ is a current frame signal of an input signal, wherein $s_k'(i)$ is a filtered restoration signal obtained by filtering the current frame signal, and wherein $y_k$ is an intermediate variable in a filtering process.

5. A method implemented by a digital signal processing system for clipping control, comprising:

updating a clipping factor according to a maximum absolute value FrameLev in a current frame signal;

obtaining a clipping restoration filter according to the clipping factor;

filtering the current frame signal according to the clipping restoration filter to obtain a filtered clipping restoration signal;

calculating an automatic gain control factor according to the clipping factor;

performing gain adjustment on the clipping restoration signal according to the automatic gain control factor to obtain an output signal, and providing, by the digital signal processing system, the output signal for the clipping control to a computing device to obtain a restored audio signal with better subjective quality, said computing device outputting the restored audio signal, wherein calculating the automatic gain control factor according to the clipping factor comprises:

$$g_k = \alpha g_{k-1} + \frac{(1-\alpha)}{1+2|C_k|},$$

wherein $g_k$ is an automatic gain control factor of the current frame signal, wherein $g_{k-1}$ is an automatic gain control factor of a previous frame signal, wherein $C_k$ is the clipping factor of the current frame signal, and wherein $\alpha$ is a gain update factor.

6. A method implemented by a digital signal processing system for clipping control, comprising:

updating a clipping factor according to a maximum absolute value FrameLev in a current frame signal;

obtaining a clipping restoration filter according to the clipping factor;

filtering the current frame signal according to the clipping restoration filter to obtain a filtered clipping restoration signal;

calculating an automatic gain control factor according to the clipping factor;

performing gain adjustment on the clipping restoration signal according to the automatic gain control factor to obtain an output signal, and providing, by the digital signal processing system, the output signal for the clipping control to a computing device to obtain a restored audio signal with better subjective quality, said computing device outputting the restored audio signal, wherein performing gain adjustment on the clipping restoration signal according to the automatic gain control factor to obtain the output signal comprises:

interpolating, according to an automatic gain control factor $g_{k-1}$ of a previous frame signal and an automatic gain control factor $g_k$ of the current frame signal, to obtain a gain control curve $G\{g(i)\}$; and performing gain adjustment on the clipping restoration signal to obtain the output signal: $s''(i)=s'(i) \times g(i)$, wherein $s_k'(i)$ is a filtered restoration signal obtained by filtering the current frame signal, and wherein $s''(i)$ is an output signal after gain adjustment.

7. The method for clipping control according to claim 6, wherein interpolating, according to the automatic gain control factor $g_{k-1}$ of the previous frame signal and the automatic gain control factor $g_k$ of the current frame signal, to obtain the gain control curve $G\{g(i)\}$ comprises obtaining the gain control curve $G\{g(i)\}$ by using linear interpolation according to the automatic gain control factor $g_{k-1}$ of the previous frame signal and the automatic gain control factor $g_k$ of the current frame signal.

8. The method for clipping control according to claim 7, wherein obtaining the gain control curve $G\{g(i)\}$ by using the linear interpolation according to the automatic gain control factor $g_{k-1}$ of the previous frame signal and the automatic gain control factor $g_k$ of the current frame signal comprises using an expression:

$$g(i) = g_{k-1} + i \times \frac{g_k - g_{k-1}}{N},$$

wherein N is a number of sampling points in a frame signal.

9. A digital signal processing system for clipping control, comprising:

a clipping factor updating unit configured to update a clipping factor according to a maximum absolute value FrameLev in a current frame signal;

a clipping restoration filter obtaining unit configured to obtain a clipping restoration filter according to the clipping factor; and a filter unit configured to filter the current frame signal according to the clipping restoration filter to obtain a filtered clipping restoration signal and to provide the filtered clipping restoration signal for the clipping control from the digital signal processing system to a computing device to obtain a restored audio signal with better subjective quality, said computing device outputting the restored audio signal, wherein the clipping factor updating unit is configured to:

rapidly increase a clipping factor C according to $C_k=C_{k-1}+\beta_1$ when the maximum absolute value FrameLev is greater than THR1;

slowly decrease the clipping factor C according to $C_k=C_{k-1}-\beta_2$ when the maximum absolute value FrameLev is less than or equal to THR1 and is greater than THR2;

rapidly decrease the clipping factor C according to $C_k=C_{k-1}-\beta_3$ when the maximum absolute FrameLev is less than or equal to THR2 and is greater than THR3; and keep the clipping factor C unchanged according to $C_k=C_{k-1}$ when the maximum absolute FrameLev is less than or equal to THR3, wherein THR1, THR2, and THR3 represent amplitude intervals of a signal, wherein $-2<=$THR3$<$THR2$<$THR1$<=2^x$, wherein x is a number of bits of a signal processing system, wherein $\beta_1$, $\beta_2$, and $\beta_3$ represent update speeds of the clipping factor C, wherein $0<=\beta_2<\beta_3<\beta_1<=1$, wherein $C_k$ is the clipping factor of the current frame signal, and wherein $C_{k-1}$ is a clipping factor of a previous frame signal.

10. The digital signal processing system for clipping control according to claim 9, further comprising a regulating unit configured to regulate the clipping factor of the current frame signal output by the clipping factor updating unit within an interval [0, 1].

11. A digital signal processing system for clipping control, comprising:

a clipping factor updating unit configured to update a clipping factor according to a maximum absolute value FrameLev in a current frame signal;

a clipping restoration filter obtaining unit configured to obtain a clipping restoration filter according to the clipping factor; and a filter unit configured to filter the current frame signal according to the clipping restoration filter to obtain a filtered clipping restoration signal and to provide the filtered clipping restoration signal for the clipping control from the digital signal processing system to a computing device to obtain a restored audio signal with better subjective quality, said computing device outputting the restored audio signal, wherein when the clipping restoration filter is a 1-order all-pass filter, the clipping restoration filter obtaining unit is specifically configured to obtain a state function of the 1-order all-pass filter using an expression:

$$H_k(z) = \frac{1 - \eta_k z}{z - \eta_k},$$

wherein $\eta_k$ is a filter parameter, wherein $\eta_k = \lambda C_k$, wherein $|\lambda|<1$, and wherein $C_k$ is the clipping factor of the current frame signal.

12. The digital signal processing system for clipping control according to claim 11, wherein the filter unit is specifically configured to filter the current frame signal according to the following expressions to obtain the filtered clipping restoration signal:

$$s_k'(i) = \eta_k \times s_k(i) + y_{k-1},$$

$$y_k = s_k(i) + \eta_k \times s_k'(i)$$

wherein $s_k(i)$ is a current frame signal of an input signal, wherein $s_k'(i)$ is a filtered restoration signal obtained by filtering the current frame signal, and wherein $y_k$ is an intermediate variable in a filtering process.

13. A digital signal processing system for clipping control, comprising:

a clipping factor updating unit configured to update a clipping factor according to a maximum absolute value FrameLev in a current frame signal;

a clipping restoration filter obtaining unit configured to obtain a clipping restoration filter according to the clipping factor;

a filter unit configured to filter the current frame signal according to the clipping restoration filter to obtain a filtered clipping restoration signal;

an automatic gain control factor calculation unit configured to calculate an automatic gain control factor according to the clipping factor; and a gain adjustment unit configured to perform gain adjustment on the clipping restoration signal according to the automatic gain control factor to obtain an output signal and to provide the output signal for the clipping control from the digital signal processing system to a computing device to obtain a restored audio signal with better subjective quality, said computing device outputting the restored audio signal, wherein the automatic gain control factor calculation unit calculates the automatic gain control factor according to the following expression:

$$g_k = \alpha g_{k-1} + \frac{(1-\alpha)}{1+2|C_k|},$$

wherein $g_k$ is the automatic gain control factor of the current frame signal, wherein $g_{k-1}$ is an automatic gain control factor of a previous frame signal, wherein $C_k$ is the clipping factor of the current frame signal, and wherein $\alpha$ is a gain update factor.

14. The digital signal processing system for clipping control according to claim 13, wherein the gain adjustment unit is specifically configured to:

interpolate, according to the automatic gain control factor of the previous frame signal $g_{k-1}$ and the automatic gain control factor of the current frame signal $g_k$, to obtain a gain control curve $G\{g(i)\}$; and perform gain adjustment on the clipping restoration signal to obtain an output signal:

$$s''(i)=s'(i) \times g(i),$$

wherein $s_k'(i)$ is a filtered restoration signal obtained by filtering the current frame signal, and wherein $s''(i)$ is an output signal after gain adjustment.

15. The digital signal Processing system for clipping control according to claim 14, wherein the gain adjustment unit is specifically configured to obtain the gain control curve $G\{g(i)\}$ by using linear interpolation according to the automatic gain control factor $g_{k-1}$ of the previous frame signal and the automatic gain control factor $g_k$ of the current frame signal.

* * * * *

UNITED STATES PATENT AND TRADEMARK OFFICE
CERTIFICATE OF CORRECTION

PATENT NO. : 8,862,257 B2
APPLICATION NO. : 13/335300
DATED : October 14, 2014
INVENTOR(S) : Deming Zhang It is certified that error appears in the above-identified patent and that said Letters Patent is hereby corrected as shown below:

In the Claims

Column 9, Lines 12 and 27, Claim 1 should read:

A method implemented by a digital signal processing system for clipping control, comprising:
updating a clipping factor according to a maximum absolute value FrameLev in a current frame signal;
obtaining a clipping restoration filter according to the clipping factor;
filtering the current frame signal according to the clipping restoration filter to obtain a filtered clipping restoration signal;
calculating an automatic gain control factor according to the clipping factor;
performing gain adjustment on the clipping restoration signal according to the automatic gain control factor to obtain an output signal; and
providing, by the digital signal processing system, the output signal for the clipping control to a computing device to obtain a restored audio signal with better subjective quality,
wherein updating the clipping factor according to the maximum absolute value FrameLev in the current frame signal comprises:
increasing a clipping factor $C$ according to $C_k = C_{k-1} + \beta_1$ when the maximum absolute value FrameLev is greater than THR1;
decreasing the clipping factor $C$ according to $C_k = C_{k-1} - \beta_2$ when the maximum absolute value FrameLev is less than or equal to THR1 and is greater than THR2;
decreasing the clipping factor $C$ according to $C_k = C_{k-1} - \beta_3$ when the maximum absolute value FrameLev is less than or equal to THR2 and is greater than THR3; and
keeping the clipping factor $C$ unchanged according to $C_k = C_{k-1}$ when the maximum absolute value FrameLev is less than or equal to THR3,
wherein THR1, THR2, and THR3 represent amplitude intervals of a signal,
wherein $-2^x \leq$ THR3 < THR2 < THR1 $\leq 2^x$,
wherein x is a number of bits of a signal processing system,
wherein $\beta_1$, $\beta_2$, and $\beta_3$ represent update speeds of the clipping factor $C$, Signed and Sealed this
Twenty-third Day of June, 2015

Michelle K. Lee
*Director of the United States Patent and Trademark Office* wherein $0 <= \beta_2 < \beta_3 < \beta_1 <= 1$,
wherein $C_k$ is the clipping factor of the current frame signal, and wherein $C_{k-1}$ is a clipping factor of a previous frame signal.

Column 9, Line 45, Claim 3 should read:

A method implemented by a digital signal processing system for clipping control, comprising:
 updating a clipping factor according to a maximum absolute value FrameLev in a current frame signal;
 obtaining a clipping restoration filter according to the clipping factor;
 filtering the current frame signal according to the clipping restoration filter to obtain a filtered clipping restoration signal,
 calculating an automatic gain control factor according to the clipping factor;
 performing gain adjustment on the clipping restoration signal according to the automatic gain control factor to obtain an output signal; and
 providing, by the digital signal processing system, the output signal for the clipping control to a computing device to obtain a restored audio signal with better subjective quality,
 wherein when the clipping restoration filter is a 1-order all-pass filter, a state function of the clipping restoration filter comprises:

$$H_k(z) = \frac{1 - \eta_k z}{z - \eta_k},$$

wherein $\eta_k$ is a filter parameter,
wherein $\eta_k = \lambda C_k$, $|\lambda| < 1$, and
wherein $C_k$ is the clipping factor of the current frame signal.

Column 11, Line 15, Claim 7 should read:

The method for clipping control according to claim 8, wherein interpolating, according to the automatic gain control factor $g_{k-1}$ of the previous frame signal and the automatic gain control factor $g_k$ of the current frame signal, to obtain the gain control curve $G\{g(i)\}$ comprises obtaining the gain control curve $G\{g(i)\}$ by using linear interpolation according to the automatic gain control factor $g_{k-1}$ of the previous frame signal and the automatic gain control factor $g_k$ of the current frame signal.

Column 11, Line 60, Claim 9 should read:

A digital signal processing system for clipping control, comprising:
 a clipping factor updating unit configured to update a clipping factor according to a maximum absolute value FrameLev in a current frame signal;
 a clipping restoration filter obtaining unit configured to obtain a clipping restoration filter according to the clipping factor; and
 a filter unit configured to filter the current frame signal according to the clipping restoration filter to obtain a filtered clipping restoration signal and to provide the filtered clipping restoration signal for the clipping control from the digital signal processing system to a computing device to obtain a restored audio signal with better subjective quality, wherein the clipping factor updating unit is configured to:

rapidly increase a clipping factor $C$ according to $C_k = C_{k-1} + \beta_1$ when the maximum absolute value FrameLev is greater than THR1;

slowly decrease the clipping factor $C$ according to $C_k = C_{k-1} - \beta_2$ when the maximum absolute value FrameLev is less than or equal to THR1 and is greater than THR2;

rapidly decrease the clipping factor $C$ according $C_k = C_{k-1} - \beta_3$ to when the maximum absolute FrameLev is less than or equal to THR2 and is greater than THR3; and keep the clipping factor $C$ unchanged according to $C_k = C_{k-1}$ when the maximum absolute FrameLev is less than or equal to THR3, wherein THR1, THR2, and THR3 represent amplitude intervals of a signal, wherein $-2^x <= THR3 < THR2 < THR1 <= 2^x$, wherein x is a number of bits of a signal processing system, wherein $\beta_1$, $\beta_2$, and $\beta_3$ represent update speeds of the clipping factor $C$, wherein $0 <= \beta_2 < \beta_3 < \beta_1 <= 1$, wherein $C_k$ is the clipping factor of the current frame signal, and wherein $C_{k-1}$ is a clipping factor of a previous frame signal.